J. H. Snyder.
Harvester Droppers.
Nº 42,148. Patented Mar. 29, 1864.
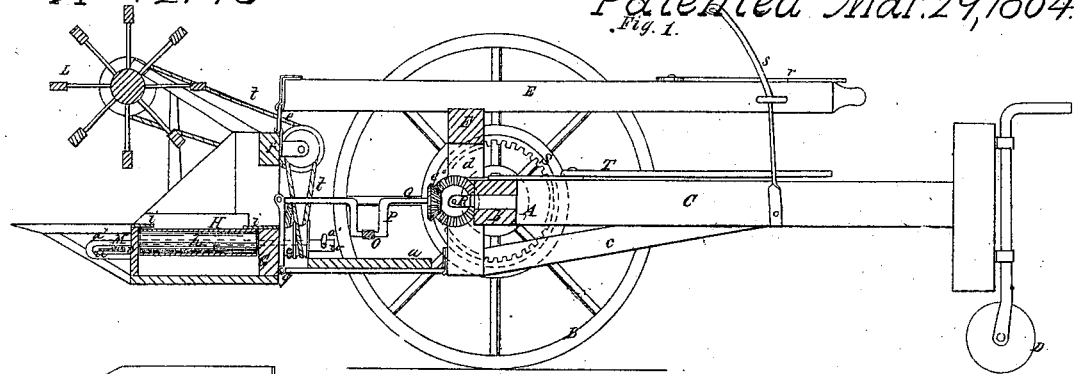
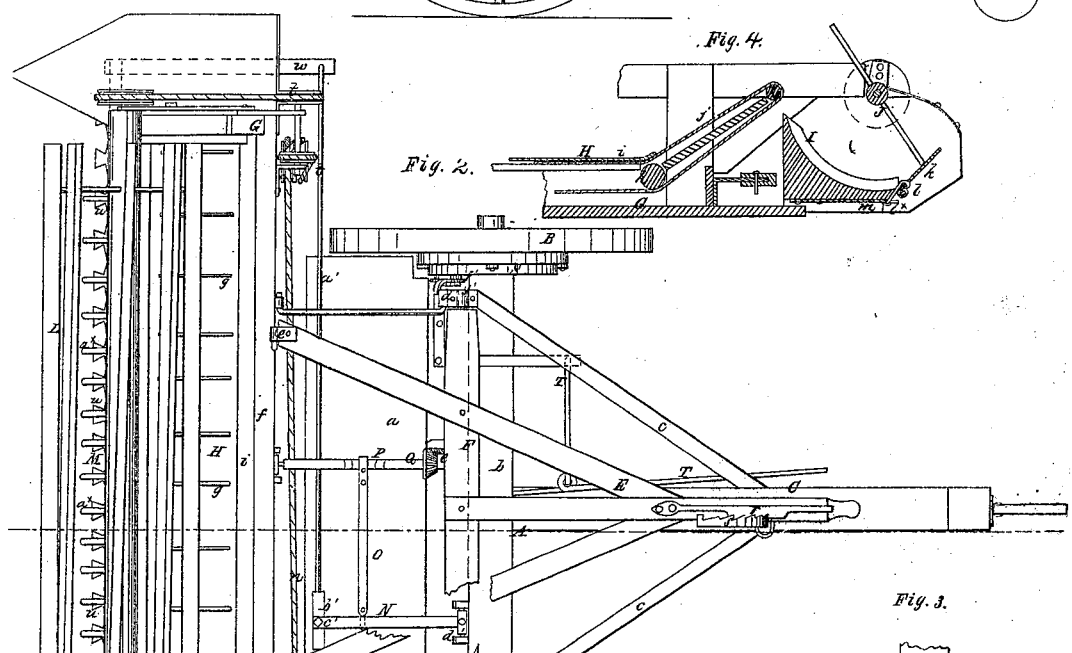
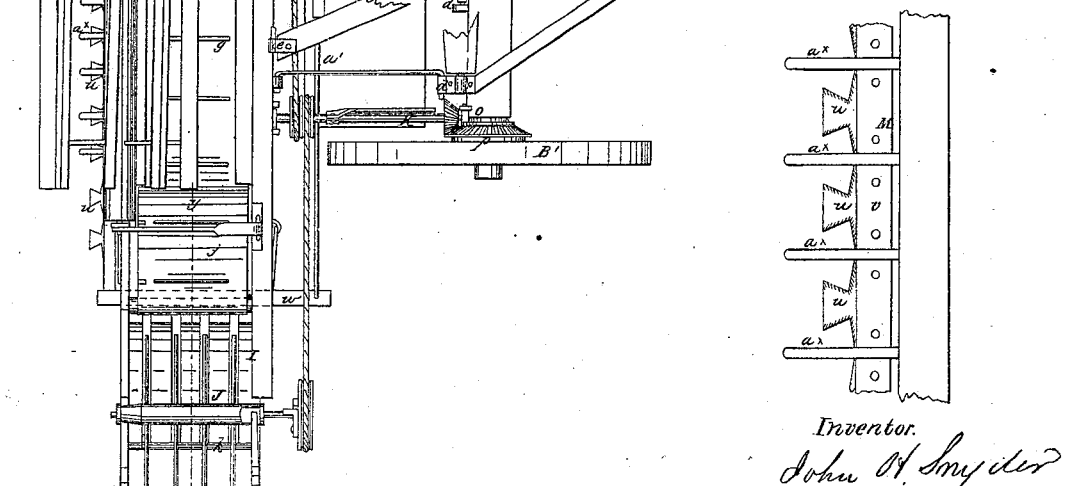
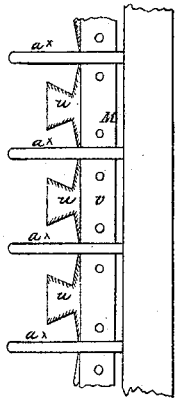
Witnesses.
Inventor.
John H. Snyder
per Munn & Co.
Attorneys

UNITED STATES PATENT OFFICE.

JOHN H. SNYDER, OF KILLBUCK, ASSIGNOR TO NELSON BIGALOW, OF SCOTT, ILLINOIS.

IMPROVEMENT IN HARVESTERS.

Specification forming part of Letters Patent No. 42,148, dated March 29, 1864.

*To all whom it may concern:*

Be it known that I, JOHN H. SNYDER, of Killbuck, in the county of Ogle and State of Illinois, have invented a new and Improved Harvesting-Machine; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, an enlarged detached portion of the sickle; Fig. 4, a section of a portion of the invention, taken in the line $y\ y$, Fig. 2.

Similar letters of reference indicate corresponding parts in the several figures.

The invention relates to a new and improved device for cutting standing grain and raking the same into gavels, which are discharged from one side of the machine, the invention being also applicable to the heading of grain by a very simple adjustment, as hereinafter fully shown and described.

To enable those skilled in the art to fully understand and construct my invention, I will proceed to describe it.

A represents what may be termed the "main frame" of the machine, the same consisting of platform, $a$, attached to an axle, $b$, having wheels B B′, one at each end, and a pole, C, attached at right angles to the axle, as shown in Fig. 2. The back end of the pole C is supported by a caster-wheel, D, and said pole is braced from the axle by diagonal bars $c$, as shown in Fig. 3.

E represents a frame, which is attached to a shaft, F, the journals of the latter having its bearings on upright $d$, secured to the axle $b$. This shaft F is allowed to turn freely in its bearings, and the front end of the frame E is connected by links $e\ e$ to a bar, $f$, which is attached longitudinally to a platform, G, the latter being parallel with the axle $b$ and extending along in front of the wheels B B′ and projecting beyond them.

On the platform G there is placed longitudinally an endless apron, H, which has transverse slats, $g$, attached to it. This apron works over suitable rollers, $h$, and it is overlapped at its edges by metal plates $i$. The apron H is inclined at one end of the platform G, as shown at $j$, and extends upward to a box, I, on which a revolving rake, J, is placed. The bottom of the box I is of concave form, and it has a yielding flap, $k$, attached to its outer end, said flap projecting upward and connected at its lower end to the box by a hinge, $l$. The flap $k$ is, when not acted upon by the rake J, retained in an upward position by means of a spring, $m$, which acts on a pin, $l^x$, depending from the flap $k$. (See Fig. 4.) The rake J is rotated by means of a bolt or cord, $a^x$, and the endless apron is driven by means of a bolt or cord, $n$, from a shaft, K, which receives motion by means of bevel-gearing $o$, from the hub $p$ of the wheel B′, as will be fully understood by referring to Fig. 2. The back part of the platform G is attached by joints $q$ to the front edge of the platform $a$ of the main frame A, and the back end of the frame E has a spring-catch, $r$, attached to it, and this catch engages with a segment rack-bar, $s$, attached to the pole C. By means of this catch and rack-bar the platform G may be held at a greater or less height, as desired, and owing to the connection of the platform to the frames A E, as shown, the former will always be raised or lowered in a proper upright position, so that the horizontality of the platform will always be preserved.

L is a reel, which may be of the usual or any proper construction. The reel works directly over the front part of the platform G, and serves to throw the cut grain back upon the endless apron H. The reel may be rotated by means of bolts or cords $t$ from one of the apron-rollers.

M represents the sickle, which is formed by attaching a series of dovetail-shaped cutters, $u$, to a bar, $v$. The form of these cutters is shown clearly in Fig. 3. They may be provided with serrated cutting-edges. This sickle works through loop or staple-shaped fingers $a'$, and the ends of the bar $v$ are connected with levers $w\ w$, the fulcrum-pins of which pass about through their centers. The back ends of these levers are connected by rods $a'\ a'$ with a cross-head, $b'$, which is attached by a pivot, $c'$, with a bar, N, the back end of which is connected by a joint, $d'$, to the axle $b$. (See Fig. 2.) The joint $d'$ admits of the bar N working in a horizontal plane, and said bar is connected by a rod or pitman, O, with a crank, P, the shaft Q of which is driven by bevel-gearing $e'$ from a shaft, R, the bearings of which are attached to the axle $b$.

On the outer end of the shaft R there is placed a ratchet-pinion, $f'$, which gears into a wheel, S, attached concentrically to the wheel B, and said pinion may be thrown in and out of gear with wheel S by means of a clutch, $g'$, and levers T. This ratchet-pinion $f'$ is so arranged that the wheel S will turn it, and consequently the shaft R, when the machine is moved in a forward direction, but not when the machine is moved backward. This arrangement, however, is not new in itself considered, and may be seen in various agricultural implements in common use.

The machine is propelled along by a team attached to its rear, and is guided by means of the caster-wheel D. The sickle is driven with a reciprocating movement through the medium of the gearing previously described, and cuts the standing grain in a most efficient manner, the cut grain falling upon the endless apron H, which conveys it into the box I, from which it is discharged by the revolving rake J in gavels upon the ground, the flap $k$ holding the grain in the box until said flap is forced outward by the teeth of the rake, at which time the grain is discharged, and the grain is cut at the desired height by adjusting the platform G higher or lower, as previously described. In heading the grain the platform is elevated to such a height that the sickle takes off the heads only.

Having thus described my invention, what I claim as new, and desire to secure by Letters Patent, is—

1. The arrangement of the cutting apparatus, apron, raker, and frame G with the V-shaped adjusting-lever E and frame A, in the manner herein shown and described.

2. The combination of the spring-flap $k$ with the rake J and box I, all constructed, arranged, and operating in the manner herein shown and described.

JOHN H. SNYDER.

Witnesses:
 NELSON BIGALOW,
 J. M. SNYDER.